(12) United States Patent
Wu et al.

(10) Patent No.: US 7,085,240 B2
(45) Date of Patent: Aug. 1, 2006

(54) DIRECTED MAXIMUM RATIO COMBINING AND SCHEDULING OF HIGH RATE TRANSMISSION FOR DATA NETWORKS

(75) Inventors: Jiangfeng Wu, Campbell, CA (US); Piu Bill Wong, Monte Sereno, CA (US); Shimon B. Scherzer, Sunnyvale, CA (US)

(73) Assignee: Kathrein-Werke KG, Rosenheim (DE)

( * ) Notice: Subject to any disclaimer, the term of this patent is extended or adjusted under 35 U.S.C. 154(b) by 1031 days.

(21) Appl. No.: 09/874,930

(22) Filed: Jun. 5, 2001

(65) Prior Publication Data

US 2003/0016737 A1    Jan. 23, 2003

Related U.S. Application Data

(60) Provisional application No. 60/237,951, filed on Oct. 3, 2000.

(51) Int. Cl.
*H04Q 7/00* (2006.01)
*H04B 17/00* (2006.01)

(52) U.S. Cl. ............ 370/252; 370/334; 370/349; 375/343; 375/350; 455/67.16; 455/562.1

(58) Field of Classification Search .......... 370/252, 370/334, 349; 375/343, 350; 455/67.16, 455/562.1
See application file for complete search history.

(56) References Cited

U.S. PATENT DOCUMENTS

| | | | |
|---|---|---|---|
| 5,471,647 A | 11/1995 | Gerlach et al. | |
| 5,634,199 A | 5/1997 | Gerlach et al. | |
| 5,886,988 A | 3/1999 | Yun et al. | |
| 6,026,304 A | 2/2000 | Hilsenrath et al. | |
| 6,108,565 A | 8/2000 | Scherzer | |
| 6,262,980 B1 | 7/2001 | Leung et al. | |
| 6,295,285 B1 | 9/2001 | Whitehead | |
| 6,347,234 B1 | 2/2002 | Scherzer | |
| 6,369,757 B1 | 4/2002 | Song et al. | |
| 6,597,678 B1 | 7/2003 | Kuwahara et al. | |
| 6,895,258 B1* | 5/2005 | Scherzer et al. | 455/562.1 |
| 6,940,824 B1* | 9/2005 | Shibutani | 370/252 |
| 2003/0002490 A1* | 1/2003 | Wong et al. | 370/355 |
| 2003/0045233 A1 | 3/2003 | Doi | |

OTHER PUBLICATIONS

U.S. Appl. No. 60/218,905, filed Jul. 18, 2000, Wong et al.

(Continued)

*Primary Examiner*—Alpus H. Hsu
(74) *Attorney, Agent, or Firm*—Fulbright & Jaworski LLP

(57) ABSTRACT

Disclosed are systems and methods which proactively determine particular access terminals which are compatible for simultaneous communication at a high data rate and preferred embodiments provide scheduling of simultaneous communications such that data communication is optimized. Preferred embodiments of the present invention utilize a multiple element antenna array, and associated array response vectors associated with narrow antenna beam forming techniques, (adaptive array antennas) to identify compatible access terminals, such as by calculating a correlation between particular access terminals and, preferably utilizing a predetermined correlation threshold, identifying suitably uncorrelated access terminals. Using such information embodiments of the present invention may determine which particular access terminals may be controlled to transmit at a high data rate at a same time. Embodiments of the present invention are operable with respect to the forward and/or reverse links.

73 Claims, 4 Drawing Sheets

OTHER PUBLICATIONS

U.S. Appl. No. 60/237,951, filed Oct. 3, 2000, Wu et al.
U.S. Appl. No. 09/874,932, filed Jun. 5, 2001, Wong et al.
Increasing the capacity of GSM cellular radio using adaptive antennas, M.C. Wells, IEE Proc.-Commun., vol. 143, No. 5, Oct. 1996.
Adaptive Antennas for GSM and TDMA Systems, Anderson, et al., IEEE Personal Communications, Jun. 1999.
CDMA/HDR: A Bandwidth Efficient High Speed Wireless Data Service for Nomadic Users, Bender, et al., Aug. 25, 1999.
TIA/EIA/IS-2000.2-A-1, Prepared by Technical Specification Group C of the Third Generation Partnership Project 2 (3GPP2), a revision of the Telecommunications Industry Association Standard TIA/EIA/IS 2000.2 (Only the Contents, Figures and Tables pages are enclosed with this filing. This document is 452 pages long. Upon Examiner's request, a full copy will be provided.)
International Search Report issued for PCT/US02/21635, dated Aug. 26, 2004.

* cited by examiner

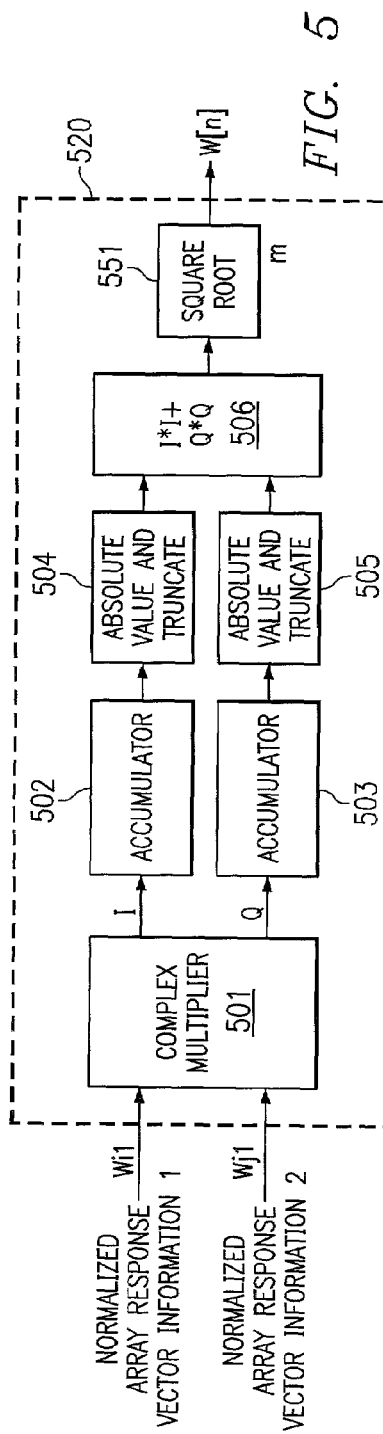
FIG. 5
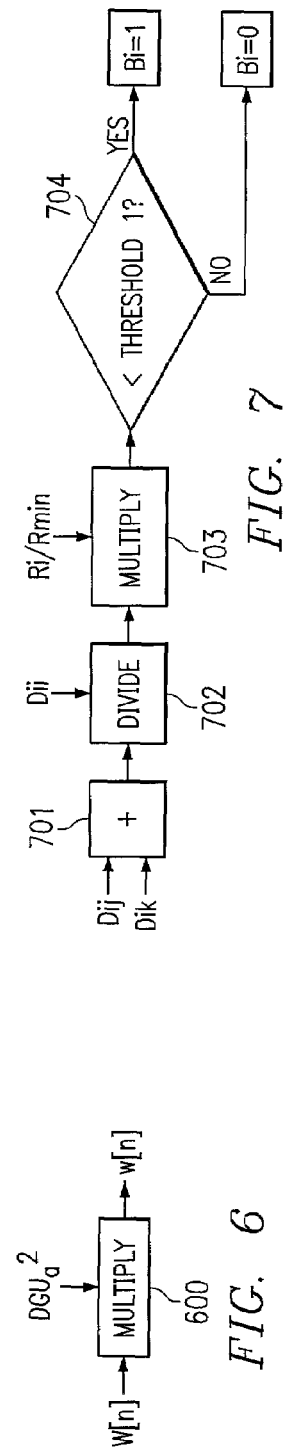
FIG. 7
FIG. 6
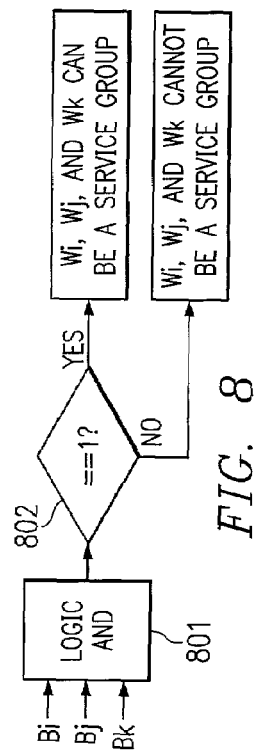
FIG. 8

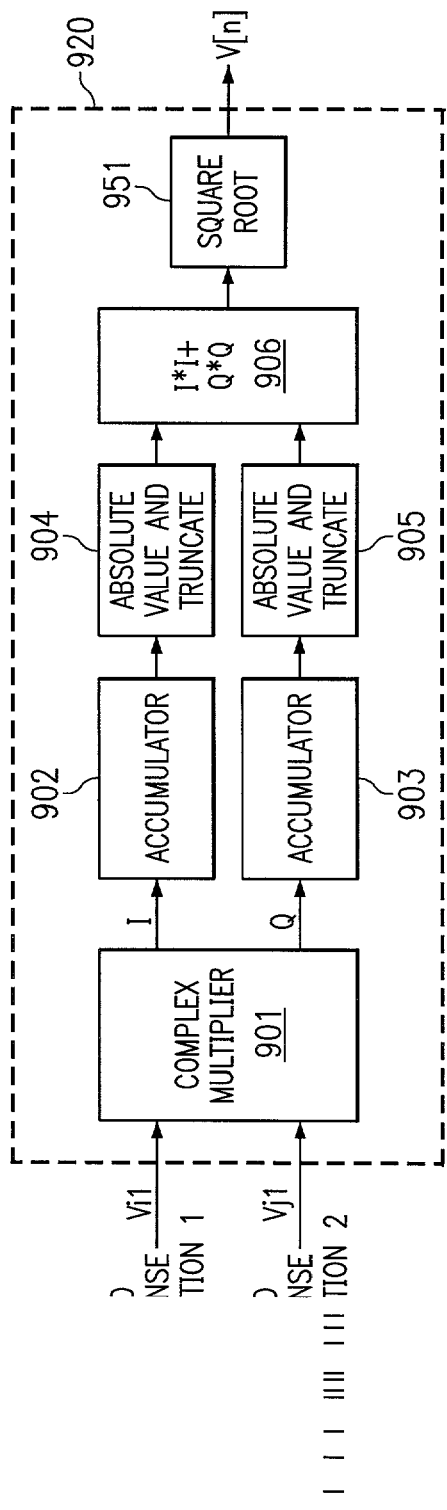
FIG. 9
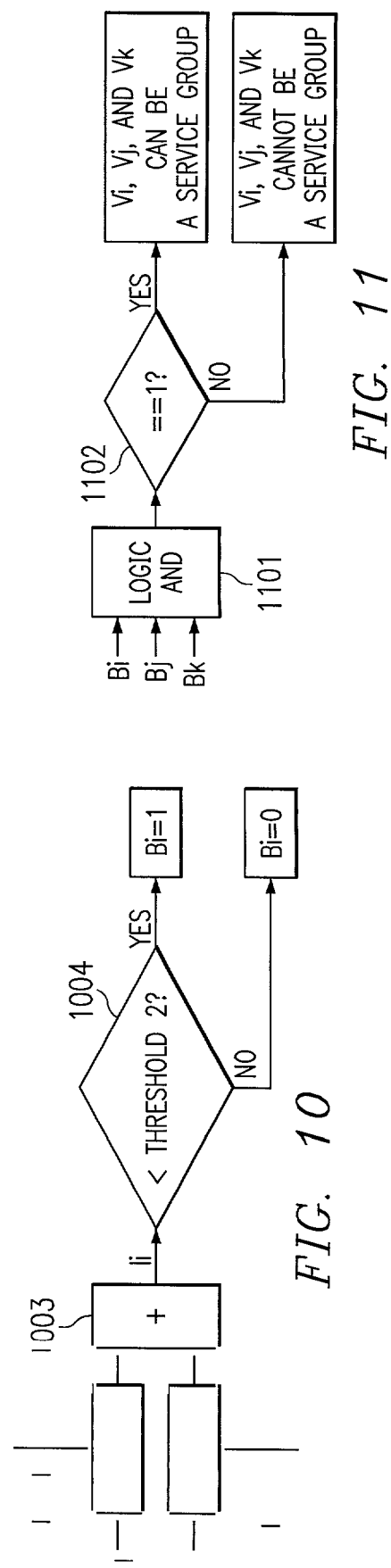
FIG. 11
FIG. 10

DIRECTED MAXIMUM RATIO COMBINING AND SCHEDULING OF HIGH RATE TRANSMISSION FOR DATA NETWORKS

CROSS-REFERENCE TO RELATED APPLICATIONS

The present application claims priority to U.S. provisional patent application Ser. No. 60/237,951 entitled "Implementation of DMRC and Scheduling of High Rate Transmission for Uplink of CDMA Data Network," filed Oct. 3, 2000, the disclosure of which is hereby incorporated herein by reference. The present application is related to and commonly assigned U.S. patent application Ser. No. 09/229,482 entitled "Practical Space-Time Radio Method for CDMA Communication Capacity Enhancement," filed Jan. 13, 1999, the disclosure of which are hereby incorporated herein by reference. The present application is related to and commonly assigned U.S. provisional patent application Ser. No. 60/218, 905 entitled "Directed Maximum Ratio Combining Methods for High Data Rate Traffic," filed Jul. 18, 2000," filed Jul. 18, 2000, and concurrently filed and commonly assigned U.S. patent application Ser. No. 09/874,932 entitled "Directed Maximum Ratio Combining Methods and Systems for High Data Rate Traffic," the disclosures of which are hereby incorporated herein by reference.

TECHNICAL FIELD

The present invention relates to, and finds utility within, wireless information communications systems and, more particularly, providing implementation of directed maximum ratio combining and scheduling of access terminal communication.

BACKGROUND OF THE INVENTION

In communication networks it is often desirable to provide optimized data communication (e.g., a plurality of simultaneous individual communication sessions and/or a high data communication rate while maintaining an acceptable signal quality). For example, wireless communication networks implementing CDMA communication protocols provide for a plurality of access terminals (ATs) transmitting simultaneously to thereby provide at least a portion of available data communication capacity to each of a plurality of ATs. In a cellular telephony network, where a plurality of ATs disposed in a particular cell or sector of a cell have data to transmit, each such AT may be permitted to transmit such data simultaneously, irrespective of the operation of the remaining ATs in the plurality.

However, wireless communication networks often are limited with respect to the amount of interference which may be tolerated in providing data communication. For example, the above mentioned systems utilizing CDMA protocols are typically interference limited in that a maximum number of ATs which may be simultaneously accommodated while maintaining a minimum acceptable signal quality is a function of the interference energy present with respect to each such AT's signal. Accordingly, wireless communication networks may implement a technique of substantially arbitrarily reducing the data rate of all or particular ones of the ATs as a function of interference energy when a number of such ATs are being provided simultaneous communications.

Systems implementing such techniques include cdma2000 1XRTT systems and QUALCOMM HDR (high data rate) systems. For example, QUALCOMM HDR systems generally allow simultaneous communications with respect to a plurality of ATs at a high data rate and monitors the communication channels. With QUALCOMM HDR systems, any and all ATs having data to communicate within a particular area, such as within the boundaries of a cell or a sector of a cell, may be allowed to transmit simultaneously. If it is determined that too much interference is being experienced, particular ATs may be restricted to a low data rate, such as based upon a random variable generated by the system. AT data rates will continue to be reduced until an acceptable level of interference is experienced.

It should be appreciated, however, that such systems may not provide optimized data communication. For example, although perhaps providing improved data communication capacity over a system in which a single AT is provided communication at a high data rate or a system in which a plurality of ATs are provided communication at a low data rate, such systems simply accommodate as many simultaneous communication sessions as possible typically without consideration of the effects upon data communication rates experienced. Accordingly, such systems are reactionary in their operation, responding to communication demands by the various ATs, and do not proactively operate to optimize data communication.

Accordingly, a need exists in the art for systems and methods providing optimized data communication with respect to a plurality of ATs.

BRIEF SUMMARY OF THE INVENTION

The present invention is directed to a system and method which proactively determines particular ATs, of a plurality of ATs having data associated therewith for communication, which are compatible for simultaneous communication at a high data rate, referred to herein as directed maximum ration combining (DMRC). Preferably, the present invention determines such compatible ATs and operates to schedule simultaneous communications such that data communication is optimized. For example, a preferred embodiment of the present invention provides structure for calculating compatibility between various ATs and protocols for selecting specific groups of ATs for simultaneous communication in an efficient manner.

Preferred embodiments of the present invention utilize a multiple element antenna array, and associated array response vectors associated with narrow antenna beam forming techniques, (adaptive array antennas) to identify compatible ATs. Specifically, by analyzing such array response vectors preferred embodiments of the invention may calculate a correlation between particular ATs and, preferably utilizing a predetermined correlation threshold, may identify suitably uncorrelated ATs. Using such information embodiments of the present invention may determine which particular ATs may be controlled to transmit at a high data rate at a same time, instead of allowing all ATs to transmit simultaneously as in prior art systems. Accordingly, an arrangement of a plurality of particular ATs is selected and controlled to transmit simultaneously which, although perhaps experiencing mutual interference, each such AT will cause less mutual interference and therefore allow a high data rate to be used by all selected ATs. Compatible ATs which are identified according to a preferred embodiment of the invention are preferably scheduled for simultaneous communication using a high data rate during a next time interval, such as during a next communication burst period, communication frame, communication super frame, or the like.

Embodiments of the present invention are operable with respect to the forward and/or reverse links. For example, a preferred embodiment of the present invention operable with respect to a cdma2000 1XRTT system assigns supplemental channels (SCHs) utilized in both the forward and reverse links to provide optimized forward link capacity as well as optimized reverse link capacity.

Preferably, embodiments of the present invention implement circuitry adapted to efficiently make AT compatibility determinations. Specifically, preferred embodiments allow for implementation not only at a reasonable expense, but facilitate operation in a real time environment in which highly mobile ATs are experiencing rapid changes in their associated communication channel.

A preferred embodiment of the present invention utilizes an infinite impulse response (IIR) filter having instantaneous, preferably normalized, correlation information of a plurality of array response vectors, each of which is associated with a particular AT, applied thereto. For example, a preferred embodiment provides an instantaneous compatibility coefficient between two array response vectors using the product of a first array response vector matrix and the conjugate of a second array response vector matrix and squaring the absolute value thereof. The instantaneous compatibility coefficient is preferably normalized, e.g., normalized to have enough precision for fixed point implementation. This preferred embodiment may provide this normalized instantaneous compatibility coefficient and a filtered normalized compatibility coefficient from a previous time interval n−1 to an IIR filter to provide a filtered correlation between the two array response vectors, and therefore between the two ATs associated with the array response vectors, at a current time interval n. Additionally, this embodiment preferably provides a reference compatibility coefficient with respect to one of the two array response vectors using the product of the first array response vector matrix and the conjugate of the first array response vector matrix and squaring the absolute value thereof. The reference compatibility coefficient is preferably normalized. The preferred embodiment may provide this normalized reference compatibility coefficient and a filtered normalized reference compatibility coefficient during a previous time interval n−1 to an IIR filter to provide a filtered reference correlation at a current time interval n.

Preferably, the filtered correlation between the two array response vectors at current time interval n is normalized and compared to the product of the filtered reference correlation and a threshold value to determine if the two ATs associated with the array response vectors are potentially compatible for simultaneous communications. This embodiment of the present invention preferably also performs the above process, reversing the array response vector for which the conjugate is used and the array response used in determining the reference correlation coefficient in the above product computation, to determine if each of the two ATs is compatible with the other AT according to the present invention. If each such normalized filtered correlation between the two array response vectors at current time interval n compares favorably to the threshold value, the two associated ATs are preferably identified for simultaneous communication.

Another preferred embodiment of the present invention preferably normalizes array response vectors associated with ATs with respect to a sector beam. A product of normalized array response vector information associated with a first AT and the conjugate of normalized array response vector information associated with a second AT is preferably determined to thereby provide a normalized compatibility coefficient. According to a preferred embodiment, the normalized compatibility coefficient is rescaled by a predicted average digital gain unit (DGU). A product of the normalized array response vector information associated with the first AT and the conjugate of the normalized array response vector information associated with the first AT is preferably determined to thereby provide a normalized reference compatibility coefficient. According to a preferred embodiment, the normalized reference coefficient is rescaled by a predicted average digital gain unit (DGU).

According to this preferred embodiment, the compatibility determination with respect to particular ATs is made with reference to the data rate. For example, in a preferred embodiment the quotient of the rescaled compatibility coefficient and the rescaled reference coefficient is multiplied by a data rate scalar, such as may be provided by the quotient of an intended data rate and a minimum channel data rate, and compared to a threshold value to determine if the two ATs associated with the array response vectors are potentially compatible for simultaneous communications. This embodiment of the present invention preferably also performs the above process, reversing the array response vector information for which the conjugate is used and the array response used in determining the reference correlation coefficient in the above product computation, to determine if each of the two ATs is compatible with the other AT according to the present invention. If each such normalized filtered correlation between the array response vector information at current time interval n compares favorably to the threshold value, the two associated ATs are preferably identified for simultaneous communication.

Embodiments of the present invention are adapted to accommodate more than two simultaneous beams in the forward and/or reverse links. Accordingly, the present invention may implement compatibility analysis, substantially as described above, with respect to a number of ATs in excess of two to determine if the multiple ATs are compatible and may be served in a single service group.

From the above, it should be appreciated that the present invention provides for optimized data communication with respect to a plurality of ATs through implementing directed maximum ration combining techniques and scheduling of AT communication.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 5 shows a preferred embodiment compatibility coefficient calculator system;

FIG. 6 shows a preferred embodiment scaling system for use with an instantaneous compatibility coefficient of the present invention;

FIG. 7 shows a preferred embodiment compatibility comparitor system;

FIG. 8 shows preferred embodiment compatibility determining logic;

FIG. 9 shows a preferred embodiment compatibility coefficient calculator system;

FIG. 10 shows a preferred embodiment compatibility comparitor system; and

FIG. 11 shows preferred embodiment compatibility determining logic.

DETAILED DESCRIPTION OF THE INVENTION

Systems and methods of the present invention preferably operate to proactively determine particular communication terminals, communication nodes, subscriber units, or other information communication sources or targets, collectively referred to herein as access terminals (ATs), which are compatible for simultaneous communication at a high data rate, referred to herein as directed maximum ration combining (DMRC). Preferably, the present invention determines such compatible ATs and operates to schedule simultaneous communications such that data communication is optimized.

Figure 1:
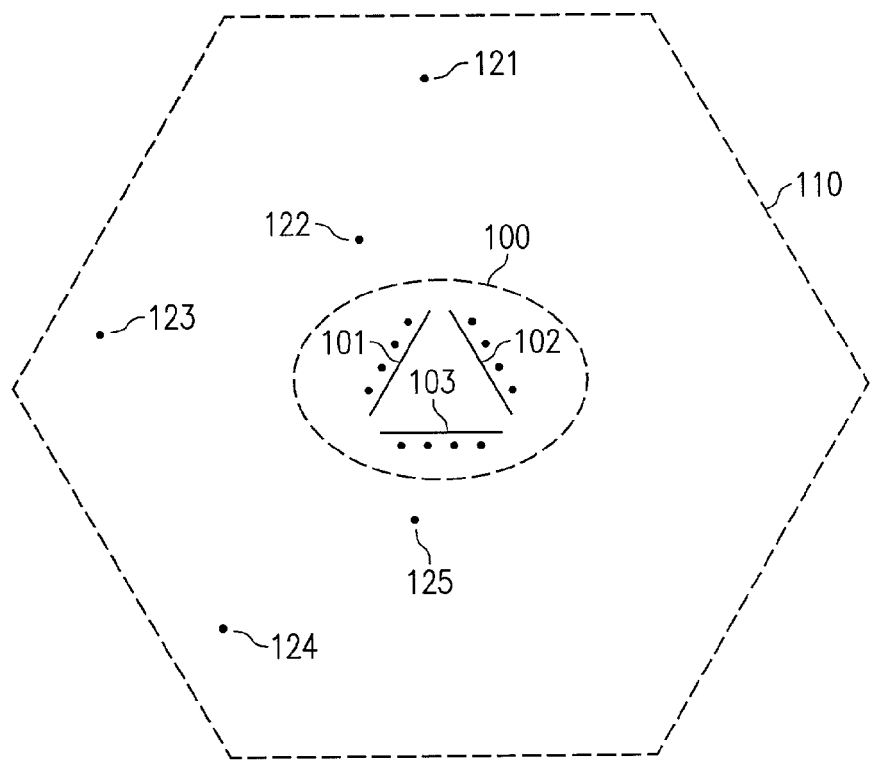
FIG. 1 shows a communication system in which embodiments of the present invention may be implemented.

For example, directing attention to FIG. 1, a communication system, such as cellular base transceiver station (BTS) 100, may provide wireless communication within a service area, such as cell 110, to a plurality of ATs, AT 121–125. Airlink channels may be established between BTS 100 and ATs 121–125 using a multiple element antenna array, such as may be provided by adaptive array antenna panels 101–103, having a plurality of antenna elements disposed in a predetermined geometry suitable for use in beamforming by applying beamforming weighting (phase and/or amplitude) with respect to signals of antenna elements of the array. Accordingly, communication signals associated with each of ATs 121–125, whether in the forward or reverse links, may each have associated therewith an array response vector providing information with respect to a wireless communication signal as received at or provided to antenna elements of the antenna array, such as angle of arrival (AOA) information. One array response vector is preferably an M by 1 complex vector, where M corresponds to a number of antenna elements or antenna element columns providing communication with respect to an AT.

A preferred embodiment of the present invention provides structure for calculating compatibility between various ATs and protocols for selecting specific groups of ATs for simultaneous communication in an efficient manner. Specifically, by analyzing array response vector information preferred embodiments of the invention may calculate a correlation between particular ATs and may identify suitably uncorrelated ATs. Using such information embodiments of the present invention may determine which particular ATs may be controlled to communicate at a high data rate at a same time, instead of allowing all ATs to communicate simultaneously as in prior art systems. Accordingly, an arrangement of a plurality of particular ATs, or a service group, is selected and controlled to communicate simultaneously.

For example, each of ATs 121–125 may have data for transmission to BTS 100 at a particular point in time. However, if each AT is permitted to transmit at this same point in time, mutual interference may result in various ones of the ATs experiencing excessive interference, e.g., bit error rates may be too high due to interference. As may be appreciated from FIG. 1, AT 121 and/or AT 122 may experience unacceptable levels of interference energy from the other one of AT 121 and AT 122. Similarly, AT 124 and/or AT 125 may experience unacceptable levels of interference energy from the other one of AT 124 and AT 125. However, it may be possible to allow each one of the combination of AT 121, AT 123, and AT 124, the combination of AT 121, AT 123, and AT 125, the combination of AT 122, AT 123, and AT 124, or the combination of AT 122, AT 123, and AT 125 to simultaneously communicate without experiencing unacceptable levels of mutual interference at any of the simultaneously communicating ATs. Accordingly, a group of such ATs may be selected for simultaneous high data rate communication during a subsequent time interval (a service group) and the remaining ones of the ATs may be scheduled for communication at a different suitable time interval. Moreover, through careful selection of the particular ATs of a service group, data rates used therewith may be maximized to thereby further optimize information communication.

Accordingly, an initial task in implementing directed maximum ratio combining according to the present invention may be to select particular ATs which can communicate simultaneously without causing excessive interference with respect to one another. Ideally, directed maximum ratio combining would utilize ATs with orthogonal array response vectors (ARVs) for simultaneous communication so that there would be no intra-cell interference with respect to these ATs and, therefore, a maximum carrier to interference ratio (C/I) and highest capacity with respect to these ATs. However, in practical system implementations, having a limited number of antenna elements and configurations, it is typically not feasible to achieve true orthogonality between many ATs. Accordingly, preferred embodiments of the present invention operate to select ATs having signals associated therewith which are substantially uncorrelated, although perhaps not achieving orthogonality, for simultaneous communication.

According to a preferred embodiment instantaneous compatibility coefficients are calculated for every combination of ATs having data for communication associated therewith. For example, where $A_i$ denotes the array response vector of the $i^{th}$ AT (i=1, 2, . . . N) and $A_j$ denotes the array response vector of the $j^{th}$ AT (j=1, 2, . . . N), instantaneous compatibility coefficients with respect to each $A_i$ and $A_j$ ($i \neq j$) are preferably calculated. A preferred embodiment instantaneous compatibility coefficient may be computed as $|A_i^* \cdot A_j|$, where $A_i^*$ denotes the conjugate transpose of $A_i$.

Preferred embodiments of the present invention, in addition to calculating compatibility coefficients for combinations of ATs, further calculate instantaneous reference coefficients for every AT having data for communication associated therewith. For example, instantaneous reference coefficients with respect to each $A_i$ are preferably calculated. It should be appreciated that the instantaneous reference coefficients of the preferred embodiment provide the instantaneous calculations with respect to $A_i$ and $A_j$ where i=j, excluded from the instantaneous compatibility coefficients calculated above. A preferred embodiment instantaneous reference coefficient may be computed as $|A_i^* \cdot A_j|$.

The instantaneous compatibility coefficient is preferably compared to the instantaneous reference coefficient to determine if the corresponding ATs are compatible for simultaneous communication as a service group. For example, if $|A_i^* \cdot A_j| < \text{thresholdA} \cdot |A_i^* \cdot A_i|$, where thresholdA is a predetermined threshold value for identifying suitably uncorrelated ATs according to the present invention, it may be determined that $AT_j$ is compatible with $AT_i$, and therefore a compatibility indicator $B_{ij}$ may be set to true (1). However, since the signal power associated with each AT is different, such as due to fading and imperfect power control, it should be appreciated that the above determination that $AT_j$ is compatible with $AT_i$ ($B_{ij}=1$) does not necessarily mean that $AT_i$ is compatible with $AT_j$. In other words, even if $AT_j$ contributed little interference to $AT_i$, $AT_i$ may contribute a substantial amount of interference to $AT_j$. Accordingly, the present invention preferably further determines if $||A_j^* \cdot A_i| < \text{thresholdA} \cdot |A_j^* \cdot A_j|$ to determine is $AT_i$ is compatible with $AT_j$, and therefore that a compatibility indicator $B_{ji}$ may be set to true (1).

It should, therefore, be appreciated that the compatibility indicator matrix B may be non-symmetrical, where the matrix B is as shown below.

$$B = \begin{matrix} B_{11} & B_{12} & \ldots & B_{1N} \\ B_{21} & B_{22} & \ldots & B_{2N} \\ \ldots & \ldots & \ldots & \ldots \\ B_{N1} & B_{N2} & \ldots & B_{NN} \end{matrix}$$

In order to select only ATs which have a least amount of interference, or an acceptably low amount of interference, for simultaneous service as a service group, preferably only mutually compatible ATs are selected as a compatible combination. For example, establishing a compatible combination indicator $S_{ij}=B_{ij} \cap B_{ji}$, if $S_{ij}=1$ $AT_i$ and $AT_j$ are a compatible combination according to a preferred embodiment of the present invention.

It should, therefore, be appreciated that the compatible combination indicator matrix S is symmetrical, where the matrix S is as shown below.

$$S = \begin{matrix} S_{11} & S_{12} & \ldots & S_{1N} \\ S_{21} & S_{22} & \ldots & S_{2N} \\ \ldots & \ldots & \ldots & \ldots \\ S_{N1} & S_{N2} & \ldots & S_{NN} \end{matrix}$$

Figure 3:
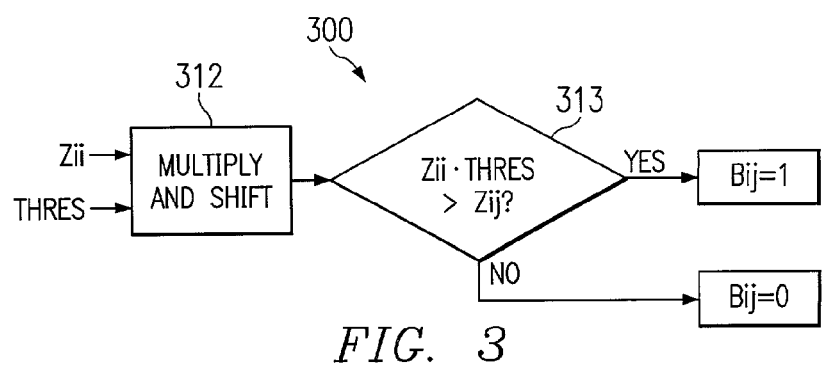
FIG. 3 shows a preferred embodiment compatibility comparitor system.
Figure 4:
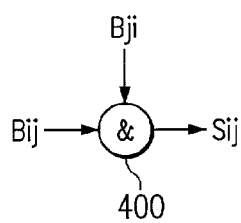
FIG. 4 shows preferred embodiment compatibility determining logic.
Figure 2:
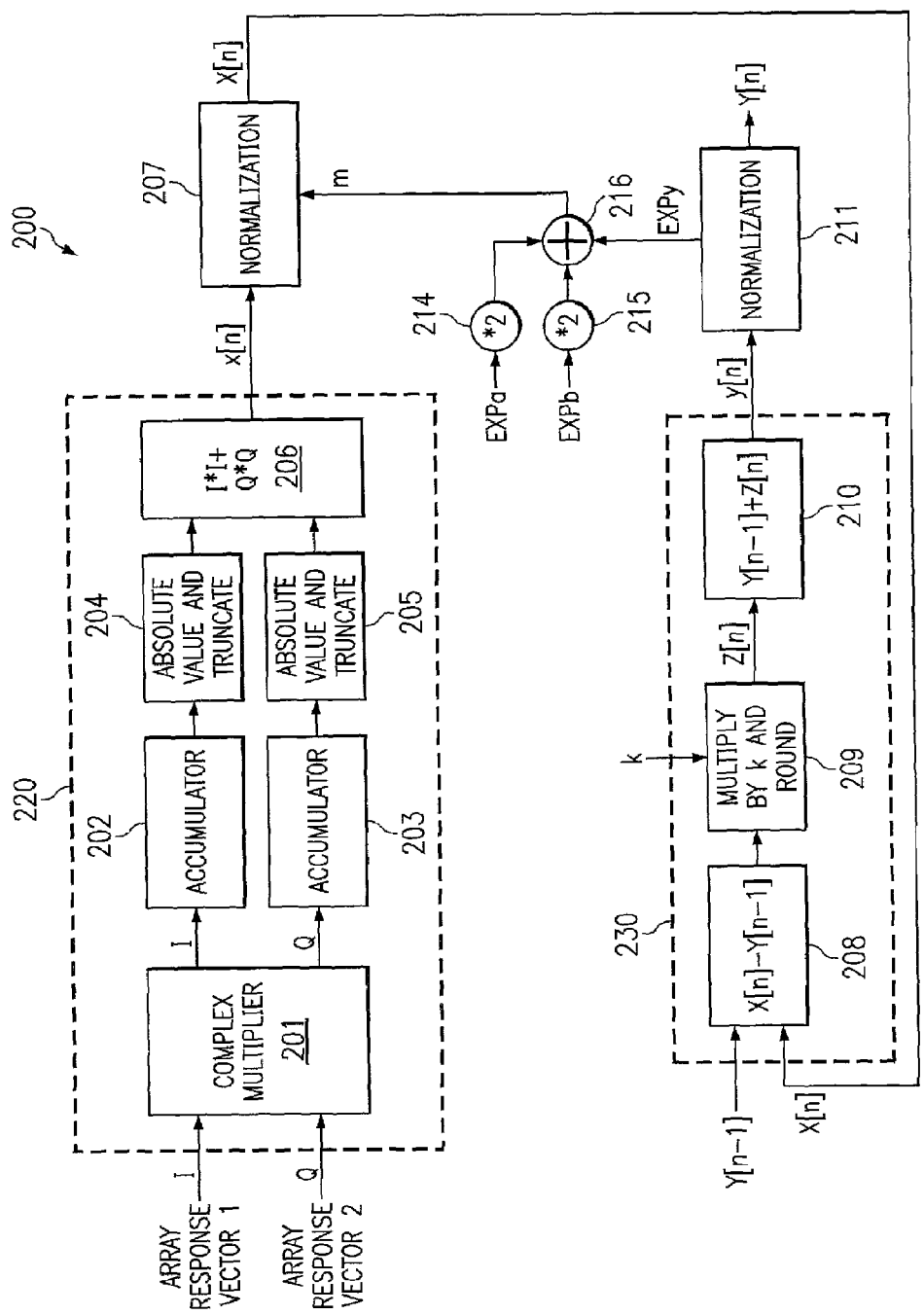
FIG. 2 shows a preferred embodiment compatibility coefficient calculator system.

FIGS. 2–4 show systems for a preferred embodiment implementation for making the above described compatibility determinations. However, it should be appreciated that various implementation issues have been addressed in the system implementations of FIGS. 2–4. For example, instead of determining $|A_i^* \cdot A_j|$, the system implementation of FIG. 2 determines $|A_i^* \cdot A_j|^2$ to thereby avoid square root computation. Additionally, each array response vector $A_1$ is expressed in n bits as $A_i \approx A_1^{nBits} \cdot 2^{EXPa}$, wherein $A_i^{nBits}$ is the most significant n bits of $A_i$ and EXPa is the number of bits shifted to normalize $A_i^{nBits}$. It should be appreciated that use of such an approximation of $A_i$ provides for normalization requiring only shifting of bits and, therefore, hardware implementation is simplified.

Directing attention to FIG. 2, a preferred embodiment system for use in implementing directed maximum ratio combining according to the present invention is shown as compatibility coefficient calculator 200. Specifically, the preferred embodiment of FIG. 2 provides instantaneous coefficient calculator 220, to accept array response vector information input and provide an instantaneous compatibility coefficient result, and IIR filter 230, to accept instantaneous compatibility coefficient results for time n and filtered compatibility correlation results for time n−1 and provide a filtered compatibility correlation result for time n.

Preferably, two sets of in-phase and quadrature array response vector information are provided to instantaneous coefficient calculator 220 for providing a calculated instantaneous coefficient x[n], where x[n] is the instantaneous result of an input vector conjugate multiplied with an input vector at time n. For example, providing in-phase and quadrature array response vector information for array response vector $A_i$ and in-phase and quadrature array response vector information for array response vector $A_j$ to instantaneous coefficient calculator 220, the output x[n] will be an instantaneous compatibility coefficient ($|A_i^* \cdot A_j|^2$) of the present invention.

It should be appreciated that, in addition to providing instantaneous compatibility coefficients, instantaneous coefficient calculator 220 may be utilized in providing instantaneous reference coefficients utilized according to the present invention. For example, providing in-phase and quadrature array response vector information for array response vector $A_i$ twice to instantaneous coefficient calculator 220, the output x[n] will be the instantaneous reference coefficient ($|A_i^* \cdot A_i|^2$) of the present invention.

Accordingly, it should be appreciated that multiple ones of the system of FIG. 2 may be implemented in parallel to accommodate such calculations, if desired. Additionally or alternatively, particular ones of the ATs may be selected for compatibility calculations or excluded from compatibility calculations, such as through reference to AOA information or other information providing a reliable indication of suitability or non-suitability for simultaneous communication which does not require compatibility calculations according to the present invention.

Referring still to FIG. 2, it is assumed that in the illustrated system the array response vectors associated with the various ATs are known and are input in complex in-phase and quadrature form to instantaneous coefficient calculator 200. Methods and structures for providing rapid beamforming for both uplink and downlink channels using adaptive antenna arrays are described in the above referenced United States patent applications entitled "Practical Space-Time Radio Method for CDMA Communication Capacity Enhancement".

According to the illustrated embodiment, the in-phase and quadrature components for the input array response vectors are preferably multiplied by complex multiplier 201, e.g., the real and imaginary parts of each matrix component of $A_i$ conjugate are multiplied with the real and imaginary parts of each corresponding matrix component of $A_j$. Accumulators 202 and 203 preferably accumulate the real and imaginary parts, respectively, resulting from the matrix component multiplication of complex multiplier 201. Absolute value and truncation circuits 204 and 205 preferably take the absolute value of the real and imaginary parts, respectively, and truncate the result to a predetermined number of most significant bits to maintain a certain bit package.

The real part truncated absolute values from absolute value and truncation circuit 204 and the imaginary part truncated absolute values from absolute value and truncation circuit 205 are preferably provided to complex conjugate adder 206 to implement a square. Accordingly, the output of complex conjugate adder 206, and therefore instantaneous coefficient calculator 220, x[n] may be $|A_i^* \cdot A_j|^2$ or $|A_i^* \cdot A_i|^2$ depending upon the vector information input at complex multiplier 201.

In order to provide for meaningful comparisons according to a preferred embodiment of the present invention, the output of instantaneous coefficient calculator 220 is preferably normalized. Accordingly, the preferred embodiment system of FIG. 2 includes normalizer 207 coupled to instantaneous coefficient calculator 220, accepting x[n] as an input and providing a corresponding normalized output X[n]. Preferably, normalization is accomplished using a relatively simple to implement bit shifting and truncating technique. Accordingly, normalizer 207 includes input m providing information with respect to a number of bits by which to shift x[n] to obtain normalized output X[n]. The normalizer value m is preferably derived as a function of a number of bit shifts utilized to normalize the array response vectors multiplied by instantaneous coefficient calculator 220, e.g., EXPa and EXPb, and a number of bit shifts utilized to normalize a filtered correlation between the two array response vectors, e.g., EXPy. Specifically, according to the illustrated embodiment, $m = (EXPa \cdot 2) + (EXPb \cdot 2) + EXPy$.

It should be appreciated that the instantaneous result x[n] of instantaneous coefficient calculator 220, e.g., $|A_i^* \cdot A_j|^2$, and correspondingly X[n], may be relatively noisy. Accordingly a preferred embodiment of the present invention implements a $1^{st}$ order infinite impulse response (IIR) filter, such as IIR filter 230 of FIG. 2, to filter the noisy result. The preferred embodiment IIR filter 230 provides filtered correlation result $y[n] = y[n-1] + k \cdot (x[n] - y[n-1])$, where y[n] is the filtered result at time n, and x[n] is the instantaneous result of at time n, and k is the filter coefficient determining the bandwidth of the IIR filter. To simplify the implementation, k is preferably chosen to be $2^{-kBits}$, where kBits is an integer determined by the filter bandwidth.

Preferably, the normalized instantaneous coefficient for time n (X[n]) and a filtered normalized coefficient from time n−1 (Y[n−1]) are provided to IIR filter 230 to provide a filtered correlation between the two array response vectors at time n (y[n]). For example, providing in-phase and quadrature array response vector information for array response vector $A_i$ and in-phase and quadrature array response vector information for array response vector $A_j$ to instantaneous coefficient calculator 220, the output y[n] of IIR filter 230 will be a filtered compatibility correlation with respect to $A_i$ and $A_j$ ($Z_{ij}$).

It should be appreciated that, in addition to providing filtered compatibility correlation results, IIR filter 230 may be utilized in providing filtered reference correlation results utilized according to the present invention. For example, providing in-phase and quadrature array response vector information for array response vector $A_i$ twice to instantaneous coefficient calculator 220, the output y[n] of IIR filter 230 will be a filtered reference correlation with respect to $A_i$ ($Z_{ii}$). Accordingly, as mentioned above, multiple ones of the system of FIG. 2 may be implemented in parallel to accommodate such calculations, if desired.

According to the illustrated embodiment, the normalized instantaneous coefficient for time n (X[n]) and the filtered normalized coefficient from time n−1 (Y[n−1]) are provided to low pass filter 208 of IIR filter 230. Preferably low pass filter 208 provides filtering according to the equation x[n]−y[n−1]. The filtered result provided by low pass filter 208 is preferably provided to filter bandwidth circuit 209, also preferably accepting filter bandwidth coefficient k, to thereby provide $k \cdot (x[n] - y[n-1])$. The result of filter bandwidth circuit 209 is preferably provided to high pass filter 210 which provides filtering according to the equation y[n−1]+z[n], wherein z[n] is the input signal (here k(x[n]−y[n−1])). Accordingly, the filtered result (y[n]) provided by high pass filter 210 is preferably $y[n-1] + k \cdot (x[n] - y[n-1])$.

In order to provide for meaningful comparisons according to a preferred embodiment of the present invention, the output of IIR filter 230 is preferably normalized. Accordingly, the preferred embodiment system of FIG. 2 includes normalizer 211 coupled to IIR filter 230, accepting y[n] as an input and providing a corresponding normalized output Y[n]. Preferably, normalization is accomplished using a relatively simple to implement bit shifting and truncating technique. Accordingly, normalizer 211 preferably shifts the result y[n] a number of bits to place most significant bits of y[n] in desired positions to thereby prevent overflow and underflow conditions. The number of bit shifts utilized (EXPy) is preferably provided as feed back for use in normalizing the instantaneous coefficient x[n] as discussed above.

Directing attention to FIG. 3, a preferred embodiment system for use in implementing directed maximum ratio combining according to the present invention is shown as compatibility comparator 300. Specifically, the preferred embodiment of FIG. 3 provides comparison of a filtered reference correlation, e.g., $Z_{ii}$, multiplied by a predetermined threshold value, e.g., thresholdA, with a filtered compatibility correlation, e.g., $Z_{ij}$.

The correlation threshold, thresholdA, of the preferred embodiment is determined by a carrier to interference ratio (C/I) which is acceptable according to system operating parameters. However, to avoid long multiplication, thresholdA is preferably chosen such that $thresholdA \approx thresholdA^{mBits} \cdot 2^{EXPthresholdA}$, where thresholdA$^{mBits}$ are preferably 1 to 3 bits. Accordingly, assuming $Z_{ij}$ is n bits representation, operation of thresholdA·$Z_{1i}$ is mBits by n bits multiplication followed by EXPthresholdA bits of shift. Such multiplication and shift functionality is preferably provided by multiplication and shift circuitry 312 having the filtered reference correlation $Z_{ii}$, such as may be provided by compatibility coefficient calculator 200 described above, and threshold value thresholdA, such as described above, input thereto.

Comparison circuit 313 preferably provides a determination as to whether the filtered reference correlation $Z_{ii}$ as multiplied by the threshold value thresholdA is less than the filtered compatibility correlation $Z_{ij}$. If the filtered reference correlation $Z_{ii}$ as multiplied by the threshold value thresholdA is less than the filtered compatibility correlation $Z_{ij}$, then the compatibility indicator $B_{ij}$ is preferably set to true (1) by compatibility comparator 300. However, if the filtered reference correlation $Z_{ii}$ as multiplied by the threshold value thresholdA is not less than the filtered compatibility correlation $Z_{ij}$, then the compatibility indicator $B_{ij}$ is preferably set to false (0) by compatibility comparitor 300.

However, as discussed above, since the signal power associated with each AT may be different, the above determination that $AT_j$ is compatible with $AT_i$ ($B_{ij}$=1) does not necessarily mean that $AT_1$ is compatible with $AT_j$. Accordingly, compatibility comparitor 300 is preferably further utilized to determine reverse compatibility through providing $Z_{jj}$ and $Z_{ji}$ for $Z_{ii}$ and $Z_{ij}$, respectively, and determining compatibility indicator $B_{ji}$. Accordingly, as mentioned above with respect to FIG. 2, multiple ones of the system of FIG. 3 may be implemented in parallel to accommodate such determinations, if desired.

Directing attention to FIG. 4, mutual compatibility is preferably determined through implementation of AND circuit 400. Specifically, compatibility indicator $B_{ij}$ and reverse compatibility indicator $B_{ji}$ are preferably provided to AND circuit 400 to determine compatible combination indicator $S_{ij}$. Specifically, if $B_{ij}$ and $B_{ji}$ are true (1), $S_{ij}$ is also true (1). However, if either or both of $B_{ij}$ and $B_{ji}$ are false (0), then $S_{ij}$ is also false (0).

It should be appreciated that when the matrix M is obtained for a plurality of ATs having data for communication, compatible combinations with multiple ATs, such as 2, 3, and more ATs, may readily be derived. However, according to a preferred embodiment when more than one group of compatible ATs are found, other criteria are applied in identifying particular ATs for a service group. For example, as shown and described in the above referenced patent application entitled "Directed Maximum Ratio Combining Methods and Systems for High Data Rate Traffic," a combination with a least transmission power may be used, such as to present a least amount of interference to other cells or cell sectors.

FIGS. 5–11 show alternative preferred embodiments of systems for making the above described compatibility determinations. The systems of FIGS. 5–11 are particularly well suited for use in determining compatible ATs for scheduling supplemental channels in systems such as those implementing 1XRTT cdma2000 protocols. Specifically, the systems of FIGS. 5–8 provide a preferred embodiment solution with respect to forward link scheduling and FIGS. 9–11 provide a preferred embodiment solution with respect to reverse link scheduling.

It should be appreciated that optimum beams used for 1XRTT cdma2000 data beam forming, whether forward link or reverse link, may be obtained from learning or other methods, such as beam correlation. Moreover, it may be, in particular system implementations, the optimum beam for data may be the same as that for voice. For example, for forward beam forming, the optimum beams may be obtained from the learning results of a voice channel to shorten the learning cycle, although the optimum beam for a data channel may be more narrow than for the voice channel if the beam widths for the data channel were to be learned separately.

In operation according to a preferred embodiment of the present invention, such as in operation with respect to a 1XRTT cdma2000 system, fundamental channel (FCH) beam forming is done as in a normal operational mode, such as a normal mode of voice communication. That is, when there is a fundamental channel, the optimum beam is preferably used instead of the sector beam. However, in operation according to this preferred embodiment, for supplemental channels (SCHs), although the optimum beams for each individual AT having information to be communicated via an SCH may be known, scheduling of such communications takes into account the compatibility of communications with respect to the ATs. Specifically, beams with mutually little interference are considered to be compatible and, therefore, may be scheduled in a service group, such as a service group of up to 4 ATs where 4 supplemental channels are supported. It should be appreciated that, at any point in time, many service group combinations of ATs may be found. However, according to the preferred embodiment of the present invention, which service group is selected for communication is determined by a scheduling algorithm which takes into account additional considerations, such as available power, channel conditions, priority, and the like.

Directing attention to FIGS. 5–8, preferred embodiment systems for providing directed maximum ratio combining in the forward link according to the present invention are shown. In FIG. 5 a preferred embodiment system for use in implementing the present invention is shown as compatibility coefficient calculator 520. Specifically, the preferred embodiment compatibility coefficient calculator of FIG. 5 accepts normalized array response vector information input and provides an instantaneous compatibility coefficient result for time n.

Preferably, two sets of normalized in-phase and quadrature array response vector information are provided to compatibility coefficient calculator 520 for providing a calculated instantaneous compatibility coefficient W[n], where W[n] is the normalized instantaneous result of an input vector conjugate multiplied with an input vector at time n. For example, the beam coefficients trained for an AT disposed at grid location i ($w_i$) may be normalized ($W_i$) with respect to sector beam coefficients ($W_p$) at target direction $AOA_j$ for input as first normalized array response vector information as shown below.

$$\|ARV_{AOA_i} \cdot conj(W_p)\|^2 = \|ARV_{AOA_i} \cdot conj(W_i)\|^2$$

Where, in the above equation, $ARV_{AOAi}$ is the antenna manifold vector at $AOA_i$. Similarly, the beam coefficients trained for an AT disposed at grid location j ($w_j$) may be normalized ($W_j$) with respect to sector beam coefficients ($W_p$) at target direction $AOA_j$ for input as second normalized array response vector information as shown below.

$$\|ARV_{AOA_i} \cdot conj(W_p)\|^2 = \|ARV_{AOA_j} \cdot conj(W_j)\|^2$$

The above normalization preferably provides a constant effective radiated power (ERP) with respect to a sector beam to thereby provide meaningful compatibility comparisons according to the present invention.

According to the illustrated embodiment, and substantially as described above with respect to FIG. 2, the in-phase and quadrature components for the input array response vector information are preferably multiplied by complex multiplier 501. Accumulators 502 and 503 preferably accumulate the real and imaginary parts, respectively, resulting from the matrix component multiplication of complex multiplier 501. Absolute value and truncation circuits 504 and 505 preferably take the absolute value of the real and imaginary parts, respectively, and truncate the result to a predetermined number of most significant bits to maintain a certain bit package.

The real part truncated absolute values from absolute value and truncation circuit 504 and the imaginary part truncated absolute values from absolute value and truncation circuit 505 are preferably provided to complex conjugate adder 506 to implement a square, and square root circuit 551 preferably computes the square root of the output of complex conjugate adder 506. Accordingly, the output of square root circuit 551, and therefore compatibility coefficient calculator 520, W[n] may be $\|W_i^* \cdot W_j\|$ or $\|W_j^* \cdot W_i\|$, where $W_i^*$ is the conjugate transpose of $W_i$, depending upon the vector information input at complex multiplier 501.

For example, providing normalized in-phase and quadrature array response vector information $W_i$ and normalized in-phase and quadrature array response vector information $W_j$ to compatibility coefficient calculator 520, the output W[n] will be an instantaneous compatibility coefficient ($\|W_i^* \cdot W_j\|$) of the present invention. It should be appreciated that, as the array response vector information input to compatibility coefficient calculator 520 is normalized, $\|W_i^* \cdot W_j\| = \|W_j^* \cdot W_i\|$. Accordingly, a compatibility indicator $C_{ij} = C_{ji} = \|W_i^* \cdot W_j\| = \|W_j^* \cdot W_i\|$.

It should be appreciated that, in addition to providing instantaneous compatibility coefficients, compatibility coefficient calculator 520 may be utilized in providing instantaneous reference coefficients utilized according to the present invention. For example, providing in-phase and quadrature array response vector information $W_i$ twice to instantaneous compatibility calculator 520, the output W[n] will be the instantaneous reference coefficient ($\|W_i^* \cdot W_i\|$) of the present invention.

Accordingly, it should be appreciated that multiple ones of the system of FIG. 5 may be implemented in parallel to accommodate such calculations, if desired. Additionally or alternatively, particular ones of the ATs may be selected for compatibility calculations or excluded from compatibility calculations, such as through reference to AOA information or other information providing a reliable indication of suitability or non-suitability for simultaneous communication which does not require compatibility calculations according to the present invention.

According to a preferred embodiment of the present invention, the compatible combination indicator for active ATs are rescaled to reflect the actual power levels, or appropriate relative power levels, and therefore reflect the actual interference associated therewith. For example, a scaled instantaneous compatibility coefficient w[n] may be determined as a function of the compatible combination indicator W[n] associated with a particular AT and the predicted digital gain unit (DGU) for that AT. For example, the scaled instantaneous compatibility coefficient w[n] associated with $AT_i$ and $AT_j$ ($D_{ij}$) may be determined as shown below.

$$D_{ij} = C_{ij} \cdot DGU_j^2$$

A preferred embodiment implementation of a system for providing the above calculations is shown in FIG. 6. Specifically, multiplier 600 accepts inputs W[n], wherein when array response vector information with respect to $W_i$ and $W_j$ are input at complex multiplier 501 W[n]=$C_{ij}$, and $DGU_a^2$=$DGU_j^2$, when W[n]=$C_{ij}$. Multiplier 600 outputs w[n], wherein w[n]=$D_{ij}$ when the above conditions are met.

It should be appreciated that compatible beams or ATs may be determined substantially as described above with respect to the preferred embodiment of FIGS. 2–4 using a threshold value (e.g., thresholdA), such that $D_{ij}$<thresholdA $D_{ii}$. However, a preferred embodiment of the present invention also takes data rate information into account when determining a service group of the present invention to thereby further optimize information communication. For example, a lowest supported data rate for a supplemental channel (SCH) may be represented as $R_{min}$ and the data rate for the supplemental channel intended to be used with a particular $AT_i$ may be represented as $R_i$. Using the scalar $R_i/R_{min}$, a preferred embodiment of the invention may determine compatible beams or ATs as a function of data rate information as shown below.

$$\frac{D_{ij}}{D_{ii}} \cdot \frac{R_i}{R_{min}} \leq threshold1_i$$

If the above condition is true, then the $AT_j$ may be determined to cause sufficiently small interference with respect to the $AT_i$ and, therefore, beam $W_j$ is compatible with $W_i$. However, it should be appreciated that beam $W_j$ being compatible with beam $W_i$ does not guarantee that beam $W_1$ is compatible with beam $W_j$. Accordingly, a preferred embodiment of the present invention further makes a reverse compatibility determination for identifying ATs for a service group as shown below.

$$\frac{D_{ij}}{D_{ii}} \cdot \frac{R_i}{R_{min}} \leq threshold1_i \text{ and } \frac{D_{ji}}{D_{jj}} \cdot \frac{R_j}{R_{min}} \leq threshold1_j$$

If the above conditions are true, then $AT_i$ and $AT_j$ may be placed in a same service group according to this embodiment of the present invention.

As previously discussed, operation of the present invention is not limited to identification of pairs of compatible ATs, but may provide service groups including any number of compatible ATs. When there are more than two beams in one service group, all such beams are preferably compatible with respect to each other. For example, according to a preferred embodiment, when there are three ATs at locations i, j, and k, the following equations are to be true for identifying the three ATs as compatible ATs.

$$\frac{D_{ij} + D_{ik}}{D_{ii}} \cdot \frac{R_i}{R_{min}} \leq threshold1_i$$

$$\frac{D_{ji} + D_{jk}}{D_{jj}} \cdot \frac{R_j}{R_{min}} \leq threshold1_j$$

$$\frac{D_{ki} + D_{kj}}{D_{kk}} \cdot \frac{R_k}{R_{min}} \leq threshold1_k.$$

A preferred embodiment implementation of a systems for providing calculations according to the above are shown in FIGS. 7 and 8. Specifically, directing attention to FIG. 7, summer 701 provides addition of the appropriate scaled instantaneous compatibility coefficients, divider 702 provides division by the appropriate scaled instantaneous compatibility coefficient, and multiplier 703 provides multiplication by the data rate scalar $R_i/R_{min}$. Comparison circuit 704 preferably provides a determination as to whether the result is less than a threshold value, here threshold1. If the result is less than the threshold, then the compatibility indicator B is preferably set to true (1). However, if the result is not less than the threshold, then the compatibility indicator B is preferably set to false (0). For example, where the scaled instantaneous compatibility coefficients provided to summer 701 are $D_{ij}$ and $D_{ik}$, and the scaled instantaneous compatibility coefficient provided to divider 702 is $D_{ii}$, $B_1$=1 indicates that beams $W_j$ and $W_k$ are compatible to $W_i$ and $B_i$=0 indicates that beams $W_j$ and $W_k$ are not compatible to beam $W_i$. Similarly, where the scaled instantaneous compatibility coefficients provided to summer 701 are $D_{ji}$ and $D_{jk}$, and the scaled instantaneous compatibility coefficient provided to divider 702 is $D_{jj}$, $B_j$=1 indicates that beams $W_i$ and $W_k$ are compatible to $W_j$ and $B_j$=0 indicates that beams $W_i$ and $W_k$ are not compatible to beam $W_j$. Likewise, where the scaled instantaneous compatibility coefficients provided to summer 701 are $D_{ki}$ and $D_{kj}$, and the scaled instantaneous compatibility coefficient provided to divider 702 is $D_{kk}$, $B_k$=1 indicates that beams $W_i$ and $W_j$ are compatible to $W_k$ and $B_k$=0 indicates that beams $W_i$ and $W_j$ are not compatible to beam $W_k$.

Directing attention to FIG. 8, AND circuit 801 is provided such that a true output (1) results if $B_i$, $B_j$, and $B_k$ are each true and a false output (0) results if any one of $B_i$, $B_j$, or $B_k$ is false. Comparison circuit 802 determines if the output of AND circuit 801 is true (1) or false (0). If true, a determination is made that beams $W_i$, $W_j$, and $W_k$ may be selected as a service group according to this preferred embodiment. However, if false, a determination is made that beams $W_i$, $W_j$, and $W_k$ may not be selected as a service group according to this preferred embodiment.

Directing attention to FIGS. 9–11, preferred embodiment systems for providing directed maximum ratio combining in the reverse link according to the present invention are shown. In FIG. 9 a preferred embodiment system for use in implementing directed maximum ratio combining according to the present invention is shown as compatibility coefficient calculator 920. Specifically, the preferred embodiment compatibility coefficient calculator of FIG. 9 accepts normalized array response vector information input and provides an instantaneous compatibility coefficient result for time n.

Preferably, two sets of normalized in-phase and quadrature array response vector information are provided to compatibility coefficient calculator 920 for providing a calculated instantaneous compatibility coefficient V[n], where V[n] is the normalized instantaneous result of an input vector conjugate multiplied with an input vector at time n. For example, the beam coefficients for the narrowest beam at directions $AOA_i$ ($v_1$) and $AOA_j$ ($v_j$) may be normalized ($V_i$ and $V_j$, respectively) for input as first and second normalized array response vector information as shown below.

$$\|V_i^T \cdot V_i\|=1 \text{ and } \|V_j^T \cdot V_j\|=1$$

According to the illustrated embodiment, and substantially as described above with respect to FIG. 5, the in-phase and quadrature components for the input array response vector information are preferably multiplied by complex multiplier 901. Accumulators 902 and 903 preferably accumulate the real and imaginary parts, respectively, resulting from the matrix component multiplication of complex multiplier 901. Absolute value and truncation circuits 904 and 905 preferably take the absolute value of the real and imaginary parts, respectively, and truncate the result to a predetermined number of most significant bits to maintain a certain bit package.

The real part truncated absolute values from absolute value and truncation circuit 904 and the imaginary part truncated absolute values from absolute value and truncation circuit 905 are preferably provided to complex conjugate adder 906 to implement a square, and square root circuit 951 preferably computes the square root of the output of complex conjugate adder 906. Accordingly, the output of square root circuit 951, and therefore compatibility coefficient calculator 920, V[n] may be $\|V_i^* \cdot V_j\|$ or $\|V_i^* \cdot V_i\|$, where $V_i^*$ is the conjugate transpose of $V_i$, depending upon the vector information input at complex multiplier 901.

For example, providing normalized in-phase and quadrature array response vector information $V_i$ and normalized in-phase and quadrature array response vector information $V_j$ to compatibility coefficient calculator 920, the output V[n] will be an instantaneous compatibility coefficient ($\|V_i^* \cdot V_j\|$) of the present invention. It should be appreciated that, as the array response vector information input to compatibility coefficient calculator 920 is normalized, $\|V_i^* \cdot V_j\|=\|V_j^* \cdot V_i\|$. Accordingly, a compatibility indicator $Q_{ij}=Q_{ji}=\|V_i^* \cdot V_j\|=\|V_j^* \cdot V_i\|$.

It should be appreciated that, in addition to providing instantaneous compatibility coefficients, compatibility coefficient calculator 920 may be utilized in providing instantaneous reference coefficients utilized according to the present invention. For example, providing in-phase and quadrature array response vector information $V_i$ twice to instantaneous compatibility calculator 920, the output V[n] will be the instantaneous reference coefficient ($\|V_i^* \cdot V_i\|$) of the present invention.

Accordingly, it should be appreciated that multiple ones of the system of FIG. 9 may be implemented in parallel to accommodate such calculations, if desired. Additionally or alternatively, particular ones of the ATs may be selected for compatibility calculations or excluded from compatibility calculations, such as through reference to AOA information or other information providing a reliable indication of suitability or non-suitability for simultaneous communication which does not require compatibility calculations according to the present invention.

According to a preferred embodiment of the present invention, the compatible combination indicator for active ATs are further processed to determine the compatibility for more than two ATs. For example, taking as an example ATs i, j, and k, each having associated therewith angles of arrival $AOA_i$, $AOA_j$, and $AOA_k$, respectively, the compatibility coefficient of $AT_j$ and $AT_k$ with respect to $AT_i$ ($I_i$) may be determined as shown below.

$$I_i = Q_{ij} \cdot \frac{R_j}{R_{\min}} + Q_{ik} \cdot \frac{R_k}{R_{\min}}$$

Similarly, the compatibility coefficient of $AT_i$ and $AT_k$ with respect to $AT_j$ ($I_j$) and the compatibility coefficient of $AT_i$ and $AT_j$ with respect to $AT_k$ ($I_k$) may be determined as shown below.

$$I_j = Q_{ji} \cdot \frac{R_i}{R_{\min}} + Q_{jk} \cdot \frac{R_k}{R_{\min}}$$

$$I_k = Q_{ki} \cdot \frac{R_i}{R_{\min}} + Q_{kj} \cdot \frac{R_j}{R_{\min}}$$

In the above preferred embodiment formulas for determining the compatibility coefficients, $R_{min}$ is probably the lowest data rate one reverse supplemental channel supports, and $R_x$ is preferably the intended data rate on the supplemental channel for the AT disposed at the direction $AOA_x$, e.g., $R_i$ is the intended data rate on the supplemental channel for $AT_i$.

A preferred embodiment implementation of a system for providing the above calculations is shown in FIG. 10. Specifically, multiplier 1001 accept input V[n], wherein when array response vector information with respect to $V_i$ and $V_j$ are input at complex multiplier 901 V[n]=$Q_{ij}$. Similarly, multiplier 1002 accepts another input V[n], wherein when array response vector information with respect to $V_i$ and $V_k$ are input at complex multiplier 901 $V[n]=Q_{ik}$. As described above with respect to FIG. 7, preferred embodiments of the present invention takes data rate information into account when determining a service group of the present invention. Accordingly, a corresponding scalar $R_x/R_{min}$, where $R_{min}$ is a lowest supported data rate for a supplemental channel (SCH) and the data rate for the supplemental channel intended to be used with a particular $AT_i$ may be represented as $R_i$, is also input in to each of multipliers 1100 and 1002 for determining compatible beams or ATs as a function of data rate information. The resulting products of multipliers 1001 and 1002 are preferably summed by summer 1003 to provide the results $I_i$, $I_j$, and $I_k$, corresponding to the particular inputs $V[n]$ provided to multipliers 1001 and 1002.

Thereafter, a determination may be made as to AT or beam compatibility, preferably through reference to a threshold value by comparison circuit 1004. Specifically, according to the illustrated embodiment, if $I_i$ is less than threshold2, where $I_i$ is provided when $Q_{ij}$ and $Q_{ik}$ and the corresponding data rate scalars are input to multipliers 1001 and 1002, then $AT_j$ and $AT_k$ are compatible with $AT_i$ according to this preferred embodiment. Similarly, if $I_j$ is less than threshold2, where $I_j$ is provided when $Q_{ji}$ and $Q_{jk}$ and the corresponding data rate scalars are input to multipliers 1001 and 1002, then $AT_i$ and $AT_k$ are compatible with $AT_j$ according to this preferred embodiment. Likewise, if $I_k$ is less than threshold2, where $I_k$ is provided when $Q_{k1}$ and $Q_{kj}$ and the corresponding data rate scalars are input to multipliers 1001 and 1002, then $AT_i$ and $AT_j$ are compatible with $AT_k$ according to this preferred embodiment.

If the result is less than the threshold, then the compatibility indicator B is preferably set to true (1). However, if the result is not less than the threshold, then the compatibility indicator B is preferably set to false (0). For example, where the compatibility coefficients provided to multipliers 1001 and 1002 are $Q_{ij}$ and $Q_{ik}$, $B_i=1$ indicates that beams $V_j$ and $V_k$ are compatible to $V_i$ and $B_i=0$ indicates that beams $V_j$ and $V_k$ are not compatible to beam $V_i$. Similarly, where the compatibility coefficients provided to multipliers 1001 and 1002 are $Q_{ji}$ and $Q_{jk}$, $B_j=1$ indicates that beams $V_i$ and $V_k$ are compatible to $V_j$ and $B_j=0$ indicates that beams $V_i$ and $V_k$ are not compatible to beam $V_j$. Likewise, where the compatibility coefficients provided to multipliers 1001 and 1002 are $Q_{k1}$ and $Q_{kj}$, $B_k=1$ indicates that beams $V_i$ and $V_j$ are compatible to $V_k$ and $B_k=0$ indicates that beams $V_i$ and $V_j$ are not compatible to beam $V_k$.

Directing attention to FIG. 11, AND circuit 1101 is provided such that a true output (1) results if $B_i$, $B_j$, and $B_k$ are each true and a false output (0) results if any one of $B_i$, $B_j$, or $B_k$ is false. Comparison circuit 1102 determines if the output of AND circuit 1101 is true (1) or false (0). If true, a determination is made that beams $V_1$, $V_j$, and $V_k$ may be selected as a service group according to this preferred embodiment. However, if false, a determination is made that beams $V_i$, $V_j$, and $V_k$ may not be selected as a service group according to this preferred embodiment.

It should be appreciated that alternative embodiments of the directed maximum ratio combining systems of FIGS. 5–11 may adopt implementation aspects as discussed above with respect to the systems of FIGS. 2–4. For example a particular implementation of the system of FIGS. 5 and/or 9 may adopt the absolute square implementation of FIG. 2 to thereby avoid a square root computation. Similarly, the systems of FIGS. 5–11 may further implement an IIR filter as shown in FIG. 2, or other noise dampering circuit, where undesirable noise is experienced in the instantaneous results of the systems of FIGS. 5 and 9.

As previously mentioned, it is typically not possible to select ATs for a service group which have truly orthogonal signal attributes associated therewith and, accordingly, the preferred embodiments of the present invention operate to select ATs for a service group having sufficiently diverse attributes so as to result in an acceptable level of interference associated with simultaneous use thereof in a service group. Accordingly, the preferred embodiments above have been discussed with respect to a predetermined threshold value utilized in determining AT compatibility for use in a service group. Such threshold values may preferably be derived as described below. In determining threshold values for use according to a preferred embodiment, various assumptions may be made, such as that the ATs are uniformly distributed over a sector of interest, that supplemental channels are not uniformly distributed over the sector of interest, that additive white Gaussian noise (AWGN) in ATs may be ignored, and $N_u$ is the number of users supported in a sector of interest.

In determining a preferred embodiment threshold for use in the forward link, threshold$1_1$, BTS transmission power for fundamental channel i and supplemental channel j in an adaptive array antenna system may be denoted as $P_{FCHi}$ and $P_{SCHj}$, respectively. When there are only fundamental channels in the sector of interest, the received signal to interference ratio ($SIR_{FCHi}$) for the AT using the fundamental channel i is shown below.

$$SIR_{FCHi} = \frac{P_{FCHi}(1-\rho)}{\left(P_{other} + \sum_k P_{FCHi}\right)\frac{1}{G_i}\rho + P^i_{inter}}$$

In the above formula, $P^i_{inter}$ is the inter-cell interference, $G_i$ is the traffic beam gain over the sector beam, $P_{other}$ is the total power of all the common channels in the same sector (such as pilot channel, sync channel, paging channel, etc.), and $\rho$ represents the ratio of the interference power due to multi-path over the total power in a particular beam of interest.

When supplemental channels are provided in the sector of interest, the received signal to interference ratio ($SIR_{SCHi}$) for the AT using the supplemental channel i is shown below.

$$SIR_{SCHi} = \frac{P_{SCHi}(1-\rho)}{\left(P_{other} + \sum_k P_{FCHi}\right)\frac{1}{G_i}\rho + \left(\sum_j C_{ij}dgu_j^2\right)\rho + P^i_{inter}}$$

$$= \frac{dgu_i^2 C_{ii}(1-\rho)}{\left(P_{other} + \sum_k P_{FCHi}\right)\frac{1}{G_i}\rho + \left(\sum_j C_{ij}dgu_j^2\right)\rho + P^i_{inter}}$$

$$= \frac{1-\rho}{\left(\sum_j D_{ij}/D_{ii}\right)\rho + \left(\left(P_{other} + \sum_k P_{FCHi}\right)\frac{1}{G_i}\rho + P^i_{inter}\right)/dgu_i^2 C_{ii}}$$

In the above equation, $C_{ij}$ and $D_{ij}$ are as defined above, and $dgu_i$ is the digital gain unit for supplemental channel i.

To support a particular data rate according to the preferred embodiment, $SIR_{SCHi} \geq SIR_F f(R_i/R_{min})$, where $SIR_F$ is the SIR required for data rate $R_{min}$ and $f(R_i/R_{min})$ represents a function of $R_i/R_{min}$. It should be appreciated that, in determining compatible ATs for service groups above, $f(R_i/R_{min})$ was assumed to equal $R_i/R_{min}$. From the above equation, the following equations can be derived.

$$\sum_{j \neq i} \frac{D_{ij}}{D_{ii}} f\left(\frac{R_i}{R_{min}}\right) \leq$$

$$\frac{1-\rho}{SIR_F \rho} - \left(\frac{\left(P_{other} + \sum_k P_{FCHi}\right)\frac{1}{G_i}\rho + P^i_{inter}}{dgu_i^2 C_{ii} \rho} + 1\right) f\left(\frac{R_i}{R_{min}}\right)$$

$$threshold1_i = \frac{1-\rho}{SIR_F \rho} - \left(\frac{\left(P_{other} + \sum_k P_{FCHi}\right)\frac{1}{G_i}\rho + P^i_{inter}}{dgu_i^2 C_{ii} \rho} + 1\right) f\left(\frac{R_i}{R_{min}}\right)$$

It should be appreciated that $$P_{other} + \sum_k P_{FCHi}$$

is the total transmission power of the base station except for the supplemental channels. Accordingly, where $SIR_F$ is known, $f(R_i/R_{min})$ is specified, and $\rho$ and $P^i_{inter}$ are assumed based on empirical data, threshold1 can be readily found.

In determining a preferred embodiment threshold for use in directed maximum ratio combining in the reverse link, threshold2 it is noted that the received power from the ATs should be approximately the same for a same data rate (due to power control algorithms according to various communication protocols, such as the aforementioned cdma2000 and HDR protocols). The received power for fundamental channels in an adaptive array antenna system may be denoted as $P_{RX}$, the data rate of a fundamental channel may be denoted as $R_i$, and the received power for a supplemental channel supporting data rate $R_i$ may be denoted as $P^R_{SCHi}$. Accordingly, $P^R_{SCH1} = P_{RX} r_1$, where $r_i = g(R_i/R_{min})$ which is a function of $R_i/R_{min}$. It should be appreciated that, in determining compatible ATs for service groups above, $g(R_1/R_{min})$ was assumed to equal $R_i/R_{min}$. When only one fundamental channel is present in a sector of interest, the received signal to interference ratio (SIR) for the AT using the fundamental channel is as shown below.

$$SIR_{RX} = \frac{P_{RX}}{(N_u - 1)P_{RX}\frac{1}{G} + I_{inter} \cdot \frac{1}{G}}$$

In the above equation, $I_{inter}$ is the inter-cell interference and G is the traffic beam gain over the sector beam. When supplemental channels are provided in the sector of interest, the received signal to interference ratio ($SIR^R_{SCHi}$) for the AT using the supplemental channel i is as shown below.

$$SIR^R_{SCHi} = \frac{P_{RX} r_i}{N_u P_{RX}\frac{1}{G} + \left(\sum_{j \neq i} Q_{ij} r_i\right) P_{RX} + I_{inter}\frac{1}{G}}$$

In the above equation, $Q_{ij}$ is as defined above.

To support a particular data rate according to a preferred embodiment, $SIR^R_{SCHi} \geq SIR_R \cdot r_1$, where $SIR_R$ is the SIR required for data rate $R_{min}$. From the above equation, the following equations can be derived.

$$\sum_{j \neq i} Q_{ij} r_j \leq \frac{1}{SIR_R} - \frac{I_{inter}}{P_{RX} G} - \frac{N_u}{G}$$

$$threshold2 = \frac{1}{SIR_R} - \frac{I_{inter}}{P_{RX} G} - \frac{N_u}{G}$$

It should be appreciated that, when $SIR_r$ is known, and $I_{inter}$ is assumed based upon empirical data, threshold2 can readily be determined.

After compatible ATs are determined according to the present invention, preferred embodiments further operate to schedule communications with respect to the ATs to further optimize information communication. For example, in an HDR system when a particular AT does not have data to communicate, but that AT is scheduled to communicate at a high data rate, network capacity is wasted. Accordingly, preferred embodiments of the invention implement scheduling techniques to more fully utilize network capacity. Two preferred embodiment scheduling techniques are described below which implement the principal that when an AT is scheduled to communicate at a high data rate that AT should have a high probability of having data to communicate associated therewith.

According to a first preferred embodiment scheduling technique, it is assumed that ATs measure if a packet of data to be communicated is a relatively short data packet or a relatively large data packet. Preferably, short data packets are transmitted at a lowest possible data rate, such as 9.6 Kbps in the aforementioned HDR systems. Correspondingly, large data packets are preferably not transmitted unless the corresponding ATs are controlled to transmit at a high data rate. Accordingly, in operation according to a preferred embodiment, ATs which do communicate when they are scheduled to communicate are presumed to have a large data packet to communicate and, therefore, have a higher probability to be scheduled for high data rate communication in a subsequent epoch.

It should be appreciated that selection of a threshold demarcating large and small data packets can affect the efficiency of the preferred embodiment scheduling technique. For example, if the threshold is too high, a large number of ATs will communicate at the lowest data rate. However, when the threshold is too low, even if an AT has data to communication in the current scheduled slots, the probability that there will still be data waiting for transmission in later epochs will not be high and, as such, the conclusion that ATs that do communicate when they are scheduled to communicate have a large data packet to communicate will not be an accurate predictor. Instead, scheduling would likely be substantially random, approaching that of prior art systems, resulting in network capacity waste.

According to another preferred embodiment scheduling technique, packet size measurements are not utilized. In this preferred embodiment, every AT communicates at the lowest possible rate, such as 9.6 Kbps in the aforementioned HDR systems, when the AT is not scheduled to transmit at a high data rate. Scheduling epochs then, preferably, look back n slot to roughly predict if an AT is likely to have data to transmit. For example, an AT having most of the past n slots at rate 0 probably does not have much data to transmit and, therefore, no high data rate will be scheduled in a current scheduling epoch. However, if all the past n slots are at a nonzero rate, the AT is determined to likely have more data to communicate and, therefore, high data rate communication will be scheduled.

It should be appreciated that the high data rate scheduling predicted based upon past data communication according to this preferred embodiment of the present invention may not always accurately predict the presence of data for high data rate communication. However, this preferred embodiment provides an advantage in not relying upon data packet measurements in determining scheduling and, therefore, may be implemented in existing protocols, such as the aforementioned HDR systems, without requiring modification to existing ATs.

It should be appreciated that the above described preferred embodiment systems may be implemented in hardware, such as using application specific integrated circuits (ASIC), or in software, such as using a general purpose processor based system having a central processing unit, memory, and suitable input/output devices operating under control of an instruction set defining operation as described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or late to be developed that perform substantially the same result as the corresponding embodiments described herein may be utilized according to the present invention. Accordingly, the appended claims are intended to include within their scope such processes, machines, manufacture, compositions of matter, means, methods, or steps.

What is claimed as new and desired to be protected by Letters Patent of the United States is:

1. A system for analyzing compatibility of access terminals, said system comprising:
    at least one array response vector information input;
    compatibility coefficient calculator circuitry accepting first array response vector information associated with a first access terminal and second array response vector information associated with a second access terminal input at said at least one array response vector information input and providing a first compatibility coefficient result as a function of an absolute value of a product of the first array response vector information and a conjugate of the second array response vector information.

2. The system of claim 1, further comprising:
    reference coefficient calculator circuitry accepting the first array response vector information input and providing a first reference coefficient result as a function of an absolute value of a product of the first array response vector information and a conjugate of the first array response vector information.

3. The system of claim 2, further comprising:
    a comparitor accepting information with respect to said first compatibility coefficient result and information with respect to said first reference coefficient result input and comparing said information with respect to said first compatibility coefficient result and said information with respect to said first reference coefficient result to determine compatibility of said second access terminal to said first access terminal.

4. The system of claim 3, wherein comparison of said information with respect to said first compatibility coefficient result and information with respect to said first reference coefficient result to determine compatibility utilizes a predetermined threshold.

5. The system of claim 4, wherein said predetermined threshold is determined by a carrier to interference ratio which is acceptable according to system operating parameters.

6. The system of claim 5, wherein said predetermined threshold (thres) is approximated for simplified implementation of said system such that thres $\approx thres^{mBits} \cdot 2^{EXPthres}$, where $thres^{mBits}$ are 1 to 3 bits.

7. The system of claim 4, wherein said predetermined threshold is selected specifically for reverse channel communication.

8. The system of claim 4, wherein said predetermined threshold is selected specifically for forward channel communication.

9. The system of claim 3, further comprising:
    second compatibility coefficient calculator circuitry accepting said first array response vector information and said second array response vector information input and providing a second compatibility coefficient result as a function of an absolute value of a product of the second array response vector information and a conjugate of the first array response vector information;
    second reference coefficient calculator circuitry accepting the second array response vector information input and providing a second reference coefficient result as a function of an absolute value of a product of the second array response vector information and a conjugate of the second array response vector information; and
    a second comparitor accepting information with respect to said second compatibility coefficient result and information with respect to said second reference coefficient result and comparing said information with respect to said second compatibility coefficient result and said information with respect to said second reference coefficient result to determine compatibility of said first access terminal to said second access terminal.

10. The system of claim 9, wherein if said comparison of said information with respect to said first compatibility coefficient result and said information with respect to said first reference coefficient result is determined to be within a predetermined threshold and said comparison of said information with respect to said second compatibility coefficient result and said information with respect to second reference coefficient result is determined to be within a predetermined threshold said first and second access terminals are identified as compatible.

11. The system of claim 9, further comprising:
    a first normalizer normalizing said first compatibility coefficient result; and
    a second normalizer normalizing said second compatibility result, wherein said first compatibility coefficient result and said second compatibility coefficient result are normalized prior to said comparison.

12. The system of claim 9, wherein said first array response vector information and said second array response vector information is normalized prior to calculation of said first compatibility coefficient result.

13. The system of claim 1, wherein said compatibility coefficient calculator circuitry comprises:
a complex multiplier accepting said first array response vector information and said second array response vector information and outputting a complex multiplication result thereof;
an accumulator accepting at least a portion of said complex multiplication result and accumulating said at least a portion of said complex multiplication result for elements of said first and second array response vector information;
an absolute value circuit accepting accumulated results of said accumulator and providing output as a function of an absolute value thereof; and
a complex summer accepting said absolute value function and providing summing with respect thereto.

14. The system of claim 1, further comprising:
an infinite impulse response filter accepting said first compatibility coefficient result and providing a filtered compatibility correlation result.

15. The system of claim 14, wherein said accepted first compatibility coefficient result and said filtered compatibility correlation result are for time n, and wherein said infinite impulse response filter further accepts a filtered compatibility correlation result for time n−1 for use in providing said filtered compatibility correlation result for time n.

16. The system of claim 15, wherein said infinite impulse response filter provides filtering of said accepted first compatibility coefficient result at time n (x[n]) as a function of said filtered compatibility correlation result for time n−1 (y[n−1]) as represented by the equation y[n]=y[n−1]+k·(x[n]−y[n−1]), where y[n] is the filtered result at time n, and k is the filter coefficient determining the bandwidth of the infinite impulse response filter.

17. The system of claim 16, wherein said filter coefficient k is selected for simplified implementation of said system such that $k=2^{-kBits}$, where kBits is an integer determined by a desired infinite impulse response filter bandwidth.

18. The system of claim 1, wherein said first array response information comprises information with respect to a signal of said first access terminal as provided to an adaptive antenna array and said second array response information comprises information with respect to a signal of said second access terminal as provided to an adaptive antenna array.

19. The system of claim 1, wherein said first array response information comprises beam coefficients of an adaptive antenna array associated with a signal of said first access terminal normalized with respect to beam coefficients of said adaptive antenna array associated with a sector signal and said second array response information comprises beam coefficients of an adaptive antenna array associated with a signal of said second access terminal normalized with respect to beam coefficients of said adaptive antenna array associated with a sector signal.

20. The system of claim 1, further comprising:
a scheduler scheduling high data rate communications with respect said access terminals as a function of said first compatibility coefficient result.

21. The system of claim 20, wherein said access terminals measure data packets to be communicated to thereby identify relatively short data packets and relatively long data packets, wherein said scheduler provides for scheduling of said relatively short data packets at a low data rates and said relatively large data packets are communicated during said high data rate communications.

22. The system of claim 21, wherein said scheduler operates to provide a higher probability of scheduling high data rate communications for access terminals not communicating during a previously scheduled low data rate communication.

23. The system of claim 21, wherein said scheduler analyzes a number of past communications in determining if a particular access terminal should have said high data rate communications scheduled.

24. A method for analyzing compatibility of access terminals, said method comprising:
accepting first array response vector information associated with a first access terminal;
accepting second array response vector information associated with a second access terminal; and
calculating a first compatibility coefficient result as a function of a product of the first array response vector information and a conjugate of the second array response vector information.

25. The method of claim 24, wherein said calculating is further a function of an absolute value of said product of the first array response vector information and said conjugate of the second array response vector information.

26. The method of claim 24, further comprising:
calculating a first reference coefficient result as a function of a product of the first array response vector information and a conjugate of the first array response vector information.

27. The method of claim 26, wherein said calculating said first reference coefficient is further a function of an absolute value of said product of the first array response vector information and said conjugate of the first array response vector information.

28. The method of claim 27, further comprising:
comparing information with respect to said first compatibility coefficient result and information with respect to said first reference coefficient result to determine compatibility of said second access terminal to said first access terminal.

29. The method of claim 28, wherein said comparing comprises:
utilizing a predetermined threshold with respect to comparison of said information with respect to said first compatibility coefficient result and said information with respect to said first reference coefficient result.

30. The method of claim 29, wherein said predetermined threshold is determined by a carrier to interference ratio which is acceptable according to system operating parameters.

31. The method of claim 30, wherein said predetermined threshold (thres) is approximated for simplified implementation of said method such that $thres \approx thres^{mBits} \cdot 2^{EXPthres}$, where $thres^{mBits}$ are 1 to 3 bits.

32. The method of claim 29, wherein said predetermined threshold is selected specifically for reverse channel communication.

33. The method of claim 29, wherein said predetermined threshold is selected specifically for forward channel communication.

34. The method of claim 28, further comprising:
calculating a second compatibility coefficient result as a function of a product of the second array response vector information and a conjugate of the first array response vector information;

calculating a second reference coefficient result as a function of a product of the second array response vector information and a conjugate of the second array response vector information; and comparing information with respect to said second compatibility coefficient result and information with respect to said second reference coefficient result to determine compatibility of said first access terminal to said second access terminal.

35. The method of claim 34, further comprising:
identifying said first access terminal and said second access terminal with a same service group for simultaneous communication if said comparison of said information with respect to said first compatibility coefficient result and said information with respect to said first reference coefficient result is determined to be within a predetermined threshold and said comparison of said information with respect to said second compatibility coefficient result and said information with respect to second reference coefficient result is determined to be within a predetermined threshold said first and second access terminals are identified as compatible.

36. The method of claim 34, further comprising:
normalizing said first compatibility coefficient result; and
normalizing said second compatibility result, wherein said first compatibility coefficient result and said second compatibility coefficient result are normalized prior to said comparison.

37. The method of claim 34, further comprising:
normalizing said first array response vector information; and
normalizing said second array response vector information, wherein said normalization is prior to calculation of said first compatibility coefficient result.

38. The method of claim 24, wherein said calculating said compatibility coefficient comprises:
multiplying said first array response vector information and said second array response vector information to thereby provide a complex multiplication result thereof;
accumulating at least a portion of said complex multiplication result for elements of said first and second array response vector information to thereby provide an accumulated result thereof;
providing an absolute value as a function of said accumulated result to thereby provide an absolute value function thereof; and
summing said absolute value function.

39. The method of claim 24, further comprising:
filtering said first compatibility coefficient result using an infinite impulse response filter to thereby provide a filtered compatibility correlation result.

40. The method of claim 39, wherein said accepted first compatibility coefficient result and said filtered compatibility correlation result are for time n, and wherein said filtering utilizes a filtered compatibility correlation result for time n−1 for in providing said filtered compatibility correlation result for time n.

41. The method of claim 40, wherein said infinite impulse response filter provides filtering of said accepted first compatibility coefficient result at time n ($x[n]$) as a function of said filtered compatibility correlation result for time n−1 ($y[n-1]$) as represented by the equation $y[n]=y[n-1]+k\cdot(x[n]+y[n-1])$, where $y[n]$ is the filtered result at time n, and k is the filter coefficient determining the bandwidth of the infinite impulse response filter.

42. The method of claim 41, further comprising:
selecting said filter coefficient k for simplified implementation of said method such that $k=2^{-kBits}$, where kBits is an integer determined by a desired infinite impulse response filter bandwidth.

43. The method of claim 24, wherein said first array response information comprises information with respect to a signal of said first access terminal as provided to an adaptive antenna array and said second array response information comprises information with respect to a signal of said second access terminal as provided to an adaptive antenna array.

44. The method of claim 24, wherein said first array response information comprises beam coefficients of an adaptive antenna array associated with a signal of said first access terminal normalized with respect to beam coefficients of said adaptive antenna array associated with a sector signal and said second array response information comprises beam coefficients of an adaptive antenna array associated with a signal of said second access terminal normalized with respect to beam coefficients of said adaptive antenna array associated with a sector signal.

45. The method of claim 24, further comprising:
identifying said first access terminal and said second access terminal with a same service group for simultaneous communication as a function of information with respect to said first compatibility coefficient result and information with respect to said first reference coefficient result using a data rate scalar.

46. The method of claim 45, wherein said data rate scalar comprises a ratio with respect to an intended data rate and a minimum data rate.

47. The method of claim 24, further comprising:
scheduling high data rate communications with respect said access terminals as a function of said first compatibility coefficient result.

48. The method of claim 47, wherein said scheduling comprises:
measuring data packets to be communicated to thereby identify relatively short data packets and relatively long data packets;
scheduling said relatively short data packets at a low data rates; and
scheduling said relatively large data packets as said high data rate communications.

49. The method of claim 48, wherein said scheduling comprises:
providing a higher probability of scheduling high data rate communications for access terminals not communicating during a previously scheduled low data rate communication.

50. The method of claim 47, wherein said scheduling comprises:
analyzing a number of past communications in determining if a particular access terminal should have said high data rate communications scheduled.

51. A system for determining compatible access terminals for simultaneous communication at a high data rate, said system comprising:
a compatibility coefficient calculator accepting first array response vector information associated with a first access terminal and second array response vector information associated with a second access terminal input and providing a first compatibility coefficient result as a function of a product of the first array response vector information and a conjugate of the second array response vector information, said compatibility coefficient calculator further providing a second compatibility coefficient result as a function of a product of the second array response vector information and a conjugate of the first array response vector information;
a reference coefficient calculator accepting the first array response vector information input and providing a first reference coefficient result as a function of an absolute value of a product of the first array response vector information and a conjugate of the first array response vector information, said reference coefficient calculator further providing a second reference coefficient result as a function of a product of the second array response vector information and a conjugate of the second array response vector information; and
a comparitor accepting information with respect to said first compatibility coefficient result and information with respect to said first reference coefficient result input and comparing said information with respect to said first compatibility coefficient result and said information with respect to said first reference coefficient result to determine compatibility of said second access terminal to said first access terminal, said comparitor further accepting information with respect to said second compatibility coefficient result and information with respect to said second reference coefficient result and comparing said information with respect to said second compatibility coefficient result and said information with respect to said second reference coefficient result to determine compatibility of said first access terminal to said second access terminal.

52. The system of claim 51, wherein comparison of said information with respect to said first compatibility coefficient result and information with respect to said first reference coefficient result to determine compatibility utilizes a predetermined threshold, and wherein comparison of said information with respect to said second compatibility coefficient result and information with respect to said second reference coefficient result to determine compatibility utilizes said predetermined threshold.

53. The system of claim 52, wherein said predetermined threshold is determined by a carrier to interference ratio which is acceptable according to system operating parameters.

54. The system of claim 53, wherein said predetermined threshold is selected specifically for reverse channel communication.

55. The system of claim 54, wherein said predetermined threshold is selected specifically for forward channel communication.

56. The system of claim 51, further comprising:
an infinite impulse response filter accepting said first compatibility coefficient result and providing a first filtered compatibility correlation result and accepting said second compatibility coefficient result and providing a second filtered compatibility correlation result, wherein said information with respect to said first reference coefficient result accepted by said comparitor comprises said first filtered compatibility correlation result and said information with respect to said second compatibility coefficient result accepted by said comparitor comprises said second filtered compatibility correlation result.

57. The system of claim 56, wherein said infinite impulse response filter provides filtering of an accepted compatibility coefficient result at time n ($x[n]$) as a function of a filtered compatibility correlation result for time n−1 ($y[n-1]$) as represented by the equation $y[n]=y[n-1]+k\cdot(x[n]-y[n-1])$, where $y[n]$ is the filtered result at time n, and k is the filter coefficient determining the bandwidth of the infinite impulse response filter.

58. The system of claim 51, wherein said first array response information comprises information with respect to a signal of said first access terminal as provided to an adaptive antenna array and said second array response information comprises information with respect to a signal of said second access terminal as provided to an adaptive antenna array.

59. The system of claim 51, wherein said first array response information comprises beam coefficients of an adaptive antenna array associated with a signal of said first access terminal normalized with respect to beam coefficients of said adaptive antenna array associated with a sector signal and said second array response information comprises beam coefficients of an adaptive antenna array associated with a signal of said second access terminal normalized with respect to beam coefficients of said adaptive antenna array associated with a sector signal.

60. The system of claim 51, further comprising:
a scheduler scheduling high data rate communications with respect said access terminals as a function of said first compatibility coefficient result.

61. The system of claim 60, wherein said access terminals measure data packets to be communicated to thereby identify relatively short data packets and relatively long data packets, wherein said scheduler provides for scheduling of said relatively short data packets at a low data rates and said relatively large data packets are communicated during said high data rate communications.

62. The system of claim 61, wherein said scheduler operates to provide a higher probability of scheduling high data rate communications for access terminals not communicating during a previously scheduled low data rate communication.

63. The system of claim 60, wherein said scheduler analyzes a number of past communications in determining if a particular access terminal should have said high data rate communications scheduled.

64. A method of scheduling access terminals for high data rate communication, said method comprising:
analyzing array response vector information of a plurality of access terminals to determine at least one service group of access terminals compatible for simultaneous communication;
scheduling high data rate communications with respect to access terminals of said at least one service group.

65. The method of claim 64, wherein said scheduling comprises:
measuring data packets to be communicated to thereby identify relatively short data packets and relatively long data packets;
scheduling said relatively short data packets at a low data rates; and
scheduling said relatively large data packets as said high data rate communications.

66. The method of claim 65, wherein said scheduling comprises:
providing a higher probability of scheduling high data rate communications for access terminals not communicating during a previously scheduled low data rate communication.

67. The method of claim 64, wherein said scheduling comprises:

analyzing a number of past communications in determining if a particular access terminal should have said high data rate communications scheduled.

68. The method of claim 64, wherein said analyzing array response vector information to determine at least one service group comprises:

using a data rate scalar for determining said at least one service group.

69. The method of claim 68, wherein said data rate scalar comprises a ratio with respect to an intended data rate and a minimum data rate.

70. The method of claim 64, wherein said analyzing array response vector information to determine at least one service group comprises:

using a predetermined threshold for determining said at least one service group.

71. The method of claim 70, wherein said predetermined threshold is determined by a carrier to interference ratio which is acceptable according to system operating parameters.

72. The method of claim 70, wherein said predetermined threshold is selected specifically for reverse channel communication.

73. The method of claim 70, wherein said predetermined threshold is selected specifically for forward channel communication.

* * * * *